United States Patent [19]
Knipf et al.

[11] Patent Number: 5,489,667
[45] Date of Patent: Feb. 6, 1996

[54] POLYETHERESTERAMIDES AND PROCESS FOR MAKING AND USING THE SAME

[75] Inventors: Helmut Knipf, Strempt Mechernich; Karl-Heinz Hapelt, Bonn; Eduard De Jong, Troisdorf-Eschmar, all of Germany

[73] Assignee: Atochem Deutschland GmbH, Bonn, Germany

[21] Appl. No.: 159,049

[22] Filed: Nov. 29, 1993

Related U.S. Application Data

[63] Continuation of Ser. No. 852,081, Mar. 16, 1992, abandoned, which is a continuation-in-part of Ser. No. 672,477, Mar. 20, 1991, abandoned.

[51] Int. Cl.$^6$ .......................... C08G 69/08; C08G 69/14; C08G 69/40; D06M 15/59
[52] U.S. Cl. .......................... 528/292; 156/166; 156/180; 156/181; 156/331.1; 156/331.5; 156/332; 525/420; 525/425; 528/323
[58] Field of Search ..................... 525/420, 425; 528/292, 323; 156/166, 180, 181, 331.1, 331.5, 332

[56] References Cited

U.S. PATENT DOCUMENTS

| | | | |
|---|---|---|---|
| 3,639,502 | 2/1972 | Okazaki et al. | 525/425 |
| 3,883,487 | 5/1975 | Raabe et al. | 528/325 |
| 4,252,920 | 2/1981 | Deleens et al. | 525/425 |
| 4,328,331 | 5/1982 | Chen et al. | 525/425 |
| 4,345,064 | 8/1982 | Mumcu | 528/288 |
| 4,349,661 | 9/1982 | Mumcu | 528/288 |
| 4,459,389 | 7/1984 | Mumcu et al. | 525/425 |
| 4,483,975 | 11/1984 | de Jong et al. | 525/425 |
| 4,536,563 | 8/1985 | Okitsu et al. | 525/425 |
| 4,587,309 | 5/1986 | Tanaka et al. | 525/425 |
| 4,727,133 | 2/1988 | Liedloff | 525/425 |
| 4,879,341 | 11/1989 | Tsumiyama et al. | 525/425 |
| 4,985,508 | 1/1991 | Müssig et al. | 525/425 |
| 5,034,450 | 7/1991 | Betz et al. | 524/538 |
| 5,096,995 | 3/1992 | Fukumoto et al. | 528/171 |
| 5,213,891 | 5/1993 | Maj et al. | 525/425 |
| 5,331,061 | 7/1994 | Liedloff | 525/425 |
| 5,409,999 | 4/1995 | Merval et al. | 525/420 |

*Primary Examiner*—James J. Seidleck
*Assistant Examiner*—Rabon Sergent
*Attorney, Agent, or Firm*—Schweitzer Cornman & Gross

[57] ABSTRACT

Poly(ether ester amides) consisting of 60% to 80% by weight of a polyamide block obtainable from the following monomers:

20 to 40% by weight of caprolactam or aminocaproic acid
30 to 50% by weight of 11-aminoundecanoic acid
20 to 40% by weight of the adduct of hexamethylenediamine and
decanedicarboxylic acid the total amount of these polyamide-forming monomers adding up to 100% by weight, and of 20 to 40% by weight of a polyether diol/dicarboxylic acid block obtainable from equimolar amounts of polyethylene glycol with an $\overline{M}_n$ molecular weight of 400 to 2,000 and one or several saturated aliphatic dicarboxylic acids with 6 to 36 carbon atoms, methods for their synthesis, spunbonded nonwovens from these poly(ether ester amides) and the use of the poly(ether ester amides) for the heat sealing of textiles.

11 Claims, No Drawings

POLYETHERESTERAMIDES AND PROCESS FOR MAKING AND USING THE SAME

This is a continuing application of U.S. Ser. No. 852,081 filed Mar. 16, 1992, which was a continuation-in-part of U.S. Ser. No. 672,477 filed on Mar. 20, 1991; the prior applications are now abandoned.

BACKGROUND OF THE INVENTION

The present invention is directed to copoly(ether ester amides), which consist of caprolactam or aminocaproic acid, 11-aminoundecanoic acid and an adduct of hexamethylenediamine and decanedicarboxylic acid as amide-forming component and of equimolar quantities of a polyethylene glycol and a saturated aliphatic dicarboxylic acid as the ether-ester-forming component. Furthermore, the present invention relates to a method for the synthesis of these copoly(ether ester amides), as well as to their use for the production of spunbonded nonwovens, which are suitable for the heat sealing of textiles.

From the DE-C-2949064, copoly(ether ester amides) are known, which are to be used as hot melt adhesives for textiles. In the polyamide portion, these copoly(ether ester amides) contain at least 30% by weight of lauryl lactam. These copoly(ether ester amides), however, have the disadvantage that, that their normal tear strength and the laundering resistance are unsatisfactory, particularly at low gluing temperatures, and that the production of the copolyamides must be carried out at high pressures and temperatures. Moreover, the copoly(ether ester amides) of this invention cannot be reeled into spunbonded nonwovens without the use of release films, since this leads to bonding of the nonwoven.

From the DE-A-3247755, copoly(ether ester amides) are known, which are to be used as hot melt adhesives for textiles. In the polyamide block, these consist of caprolactam and/or ε-aminocaproic acid, equimolar amounts of adipic acid and primary aliphatic and/or cycloaliphatic diamines, equimolar mixtures of azelaic acid and for sebacic acid and primary aliphatic and/or cycloaliphatic diamines and equimolar mixtures of decanedicarboxylic acid and/or brassylic acid and primary aliphatic and/or cycloaliphatic diamines, as well as a polyether block, which is formed from polyalkylene oxide diols and saturated aliphatic, linear dicarboxylic acids. The copoly(ether ester amides) of this invention also have a low tear strength and an unsatisfactory laundering stability at low gluing temperatures. They can also not be reeled into spunbonded nonwovens without the insertion of a release film, which would lead to the bonding of the nonwovens.

SUMMARY OF THE PRESENT INVENTION

It is therefore an object of the present invention to find hot melt adhesives for bonding textiles, which have an adequate normal tear strength and stability even at low gluing temperatures in comparison to known copoly(ether ester amide) hot melt adhesives and the processing of which to spunbonded nonwovens is readily possible, that is, the spun nonwoven can be reeled, stored and shipped immediately at the end of the conveyor belt without the insertion of a release film.

Surprisingly, it was found that the above objective can be accomplished by copoly(ether ester amides), which consist of 60% to 80% by weight of a polyamide block obtainable from the following monomers:

20 to 40% by weight of caprolactam or aminocaproic acid
30 to 50% by weight of 11-aminoundecanoic acid
20 to 40% by weight of the adduct of hexamethylenediamine and decanedicarboxylic acid, the total amount of these polyamide-forming monomers adding up to 100% by weight, and of 20 to 40% by weight of a polyether diol/dicarboxylic acid block obtainable from equimolar amounts of polyethylene glycol with an $\bar{M}_n$ molecular weight of 400 to 2,000 and one or several saturated aliphatic dicarboxylic acids with 6 to 36 carbon atoms.

Preferably, the amounts of the above-mentioned polyamide-forming components are 30 to 40% by weight of caprolactam or aminocaproic acid
30 to 40% by weight of 11-aminoundecanoic acid
25 to 35% by weight of the adduct of hexamethylenediamine and decanedicarboxylic acid.

The following amounts are particularly preferred:

33 to 37% by weight of caprolactam or aminocaproic acid
33 to 37% by weight of 11-aminoundecanoic acid
28 to 32% by weight of the adduct of hexamethylenediamine and decanedicarboxylic acid.

Poly(ether ester amides) are preferred, which consist of 65% to 75% by weight of the polyamide block and 25% to 35% by weight of the polyether diol/dicarboxylic acid block.

Poly(ether ester amides) are particularly preferred, which consist of 68% to 72% by weight of the polyamide block and of 32% to 28% by weight of the polyether diol/dicarboxylic acid block.

The method of synthesizing poly(ether ester amides) of the invention is characterized in that, based on the total amount of the components reacted, 60 to 80% by weight of the monomer mixture consisting of 20 to 40% by weight of caprolactam or aminocaproic acid
30 to 50% by weight of 11-aminoundecanoic acid
20 to 40% by weight of the adduct of hexamethylenediamine and decanedicarboxylic acid, the total amount of these polyamide-forming monomers adding up to 100% by weight, and 20 to 40% by weight of equimolar amounts of a polyethylene glycol diol with an $\bar{M}_n$ molecular weight of 400 to 2,000 and one or several saturated aliphatic dicarboxylic acids with 6 to 36 carbon atoms are copolycondensed, the polyamide-forming monomers and the aliphatic dicarboxylic acids being reacted first in the usual manner with the formation of a polyamide with terminal carboxyl groups and the reaction product then being reacted with the polyethylene glycol, optionally in the presence of a conventional catalyst.

A polyethylene glycol diol with a number average molecular weight $\bar{M}_n$ of 500 to 1,000 and particularly of 500 to 800 is preferred.

As preferred saturated, aliphatic carboxylic acids of the polyether diol/dicarboxylic acid block, linear dicarboxylic acids with 6 to 13 carbon atoms are used, which are known from the references cited above. Brassic acid and particularly decanedicarboxylic acid are preferred.

A further object of the invention are spunbonded nonwovens, which are formed from these poly(ether ester amides). These spunbonded nonwovens are produced by well-known methods (refer, for example to the Handbuch der textlien Fixiereinlagen (Handbook of textile setting inserts) by Dr. Peter Sroka, Sinus-Verlag, 1980). The manufacturing method is described in greater detail below. The spunbonded nonwovens are used for the heat-sealing of textiles.

Surprisingly, it was ascertained that the copoly(ether ester amides) of the invention have a very high adhesive strength even after dry cleaning and laundering processes and at low bonding temperatures. It was furthermore surprising that, with the copoly(ether ester amides) of the present invention, spunbonded nonwovens can readily be produced, which can immediately be reeled, stored and shipped at the end of the conveyor belt, that is, without the insertion of the usually used silicone release paper. For those skilled in the art, this represents a surprising and enormous technical advance relative to the copoly(ether ester amides) of the state of the art, the use of which in this method leads to bonding of the layers of nonwoven, as shown by comparison experiments. This result is particularly unexpected because, according to the DE-A-2949064 cited above, the copoly(ether ester amides) must contain at least 30% by weight of lauryl lactam as polyamide-forming component, which is not necessary pursuant to the present invention. Although it is not contained in the copoly(ether ester amides) pursuant to the invention, these do have the above-mentioned improved properties.

The copoly(ether ester amides) melt at temperatures ranging from 90° to 130° C. The melting point is determined by the DSC method (differential scanning calorimetry method). Preferably, the melting point falls within the range of 100° to 120° C. Low melting products are particularly suitable for fusing heat-sensitive textiles. Comparison experiments show that the poly(ether ester amides), which are produced pursuant to the invention, have very good properties in comparison with copoly(ether ester amides) of the state of the art, particularly at the low bonding temperatures preferred for heat-sensitive textiles. In particular, the normal tear strength and the stability under laundering and dry cleaning conditions after bonding at low temperatures are clearly better than those obtained with copoly(ether ester amides) of the state of the art.

Advisably, the copoly(ether ester amides) have a relative solution viscosity of 1.3 to 1.75. The lower limit preferably is about 1.45, while the upper limit advisably is about 1.65. The relative solution viscosity is measured using a 0.5% solution in m-cresol at 20° C. in the Ostwald viscosimeter.

The copoly(ether ester amides) advisably have a melt index at 150° C. at 21.2N according to DIN 53735 of about 5 to 40 g/10 min. The upper limit advisably is about 30 g/min find the lower limit advisably is about 7 g/min.

The copoly(ether ester amides) are synthesized as described in the art. The synthesis is advisably concluded as follows. To begin with, the copolyamide-forming components, as well as the saturated aliphatic carboxylic acids with 6 to 36 carbon atoms are reacted with the formation of a copolyamide with terminal carboxyl groups. The reaction advisably is conducted at temperatures of 180° to 300° C. and preferably at temperatures of about 200° to 260° C. During the reaction, internal pressures of 5 to 10 bar develop, which are maintained for about 2 hours. After this pre-condensation time, the pressure is reduced slowly to atmospheric pressure by opening the valve and the remaining water is distilled off within 1 to 2 hours. Subsequently, the polyethylene glycol is added, as well as, advisably, a conventional catalyst and, under a slow current of nitrogen, the temperature is increased within 20 to 60 minutes to about 180° to 300° C. and preferably to about 260° C. The condensation is continued under a reduced pressure (<10 mbar) for 20 to 60 minutes and preferably for 30 minutes. The polycondensates obtained are spun through a perforated die into a water bath and pelletized.

Catalysts known from the state of the art for the reaction can be suitably employed. Dialkyl zirconates are preferred; the alkyl groups can be branched or linear and contain 1 to 24 carbon atoms. Tetraalkyl orthotitanates can also be used. Alkyl groups with 4 carbon atoms, particularly n-butyl compounds, are preferred. The amount of catalyst falls within the known range of about 0.01 to 5% by weight, based on the weight of the reaction mixtures. Preferably, the amount of catalyst is less than about 1% by weight.

The copoly(ether ester amides) of the invention can be extruded in conventional, commercial extrusion installations at mass temperatures of about 200° C. and processed into spunbonded nonwovens, which are tack-free immediately and can be reeled immediately without the insertion of intermediate films and shipped at once.

Textiles of various types can be bonded to one another with the help of the copoly(ether ester amides) of the invention. Examples of these are natural materials and/or synthetic materials, such as wool, silk, cotton and/or polyesters, polyamides, and the like. Furs, hides and the like can also be bonded as substrates. A copoly(ether ester amide) of the invention, preferably in the form of a spunbonded nonwoven, is inserted between the areas that are to be bonded. The copolyamide can, of course, also be used in the form of films, threads, short-cut threads and powders. It is also possible to produce dispersions by known methods from the powders and to use these for heat sealing. Bonding takes place using an elevated temperature and pressure. The press temperature depends primarily on the heat sensitivity of the substrate; however, it must be high enough so that melting and bonding take place. Upon cooling to room temperature, solidification takes place with bonding of the glued substrates.

The powders are produced in the manner known for polyamide hot melt adhesives.

EXAMPLE 1

The following components are weighed into an autoclave, which is equipped with stirrer and column:

2.45 kg caprolactam 24.5 kg 11-aminoundecanoic acid 7.0 kg hexamethylenediamine as an 80% aqueous solution 22.1 kg decanedicarboxylic acid.

After the reactor is flushed with nitrogen, the closed system is heated with stirring to 230° C. In so doing, the internal pressure increases to about 6 bar and is maintained there for about 2 hours. After this 2-hour pre-condensation, the pressure is lowered slowly to atmospheric pressure by opening a valve. The rest the water is subsequently distilled off within one hour. After the addition of 21.9 kg polyethylene glycol ($\bar{M}_n$=600) and 0.4 kg di-n-butyl zirconate heating is increased under a slow flow of nitrogen so that the temperature reaches 260° C. within 30 minutes. The condensation is subsequently continued for 30 minutes under a reduced pressure (<10 mbar). The polycondensate obtained is spun through a perforated die into a water bath and pelletized. The physical properties measured are given in the following Table.

The pelletized material is milled in a conventional cold-milling installation. The powder obtained is separated into different particle size ranges on conventional, commercial screens. The 80–200 μm fraction is examined for its textile technology properties. The results obtained are given in the following Table 1.

Additional examples 2 to 6 have been prepared in the manner of example 1 using the same temperature and pressure conditions and the same weight ratio of polyetheresteramide to the catalyst (di-n-butyl zirconate).

COMPARISON EXAMPLE 1: in accordance with DE-C-2949064 (claim 1)

As described in Example 1, the following components were weighed out 21.0 kg caprolactam 28,0 kg lauryl lactam 7.0 kg hexamethylenediamine as an 80% aqueous solution 22.1 kg decanedicarboxylic acid and heated to a temperature of 290° C. The internal pressure increased to 25 bar. After a 2-hour pre-condensation, the pressure was reduced to atmospheric within one hour. After a half hour dehydrating phase (if necessary, under a slight flow of nitrogen or a reduced pressure), the temperature was lowered to 260° C. After that, the following components were weighed in:

21.9 kg polyethylene glycol ($\bar{M}_n$=600)

0.4 kg di-n-butyl zirconate

After that, the condensation was continued under a reduced pressure (<10 mbar) at 260° C. for one hour up to the desired final viscosity. The polycondensate obtained was pelletized as in Example 1, milled and examined. The values determined are given in the following Table 1.

COMPARISON EXAMPLE 2: in accordance with DE-C-2949064 (Example 5)

A copoly(ether ester amide), corresponding to that of Example 5 of the DE-C-2949064 was synthesized as described in Example 5 from the following components:

11.52 kg lauryl lactam 6.40 kg caprolactam 3.40 kg hexamethylenediamine as an 80% solution 5.66 kg polytetrahydrofuran, $\bar{M}_n$=1,000

5.01 kg adipic acid 0.13 kg di-n-butyl zirconate

The milled and classified product was examined as described in Example 1. The values determined are given in the following Table 1.

In the following Table, the temperature data for the measurement of the strengths are the plate temperatures between the substrates, which are to bonded. The heat sealing is conducted for 15 seconds at 350 mbar. The tear strength is given in Newton per 50 mm of test specimen width and is similar to that of DIN 54310. The glued substrate was an interlining material consisting of 100% cotton, the shell being a mixed weave of 55%/45% polyester/virgin wool.

TABLE 1

|  | Example 1 | Comparison Example 1 | Comparison Example 2 | Example 2 |
|---|---|---|---|---|
| Caprolactam | 24.5% by weight | 21.0% by weight | 20.0% by weight | 21% by wt. |
| Lauryl Lactam |  | 28.0% by weight | 36.0% by weight | — |
| 11-Aminoundecanoic Acid | 24.5% by weight |  |  | 21% by wt. |
| Hexamethylenediamine/ Decanedicarboxylic Acid | 21.0% by weight | 21.0% by weight |  | 28% by wt. |
| Hexamethylenediamine/ Adipic Acid |  |  | 24.0% by weight | — |
| PEG/Decanedicarboxylic Acid | 30.0% by weight | 30.0% by weight |  |  |
| PTHF/Adipic Acid |  |  | 20.0% by weight | 30% by wt. |
| Melting Range °C. | 110–115 | 108–113 | 110–122 | 120–125 |
| Relative Solution Viscosity | 1.60 | 1.59 | 1.50 | 1.59 |
| Melt Index at 150° C. DIN 53735 | 13.0 | 15.0 | 11.0 | 13 |
| Normal Tear Strength |  |  |  |  |
| 120° C. | 9.0 | 5.5 | <1.5 | 5.0 |
| 130° C. | 12.0 | 6.5 | 10.0 | 10.0 |
| 140° C. | 12.5 | 7.5 | 11.0 | 12.0 |
| 150° C. | 15.5 | 8.5 | 14.0 | 15.0 |
| 160° C. | 16.5 | 9.0 | 16.0 | 16.0 |
| Laundering 5 × 60° C. |  |  |  |  |
| 120° C. | 9.0 | 4.0 | 8.0 | 5.0 |
| 130° C. | 11.0 | 4.0 | 10.0 | 10.0 |
| 140° C. | 12.0 | 3.5 | 10.5 | 11.0 |
| 150° C. | 15.5 | 4.5 | 14.0 | 15.0 |
| 160° C. | 16.0 | 5.0 | 15.5 | 15.0 |
| Dry Cleaning 5x |  |  |  |  |
| 120° C. | 9.0 | 3.0 | 7.0 | 5.0 |
| 130° C. | 11.0 | 3.5 | 10.0 | 10.0 |
| 140° C. | 12.5 | 4.0 | 12.0 | 12.0 |
| 150° C. | 16.5 | 5.0 | 15.0 | 16.0 |
| 160° C. | 16.0 | 6.0 | 16.0 | 16.0 |
| Weight Applied | 15 | 15 | 17 | 15 |

|  | Example 3 | Example 4 | Example 5 | Example 6 |
|---|---|---|---|---|
| Caprolactam | 28% by wt. | 14% by wt. | 21% by wt. | 28% by wt. |
| Lauryl Lactam | — | — | — | — |
| 11-Aminoundecanoic Acid | 28% by wt. | 31.5% by wt. | 21% by wt. | 28% by wt. |
| Hexamethylenediamine/ Decanedicarboxylic | 14% by wt. | 24.5% by wt. | 18% by wt. | 24% by wt. |

TABLE 1-continued

| | | | | |
|---|---|---|---|---|
| Acid | | | | |
| Hexamethylenediamine/ Adipic Acid | — | — | — | — |
| PEG/Adipic Acid | 30% by wt. | 30% by wt. | 40% by wt. | 20% by wt. |
| Melting Range °C. | 108–115 | 123–128 | 108–114 | 109–115 |
| Relative Solution Viscosity | 1.59 | 1.57 | 1.60 | 1.58 |
| Melt Index at 150° C. DIN 53735 | 14 | 16 | 18 | 18 |
| Normal Tear Strength | | | | |
| 120° C. | 8.5 | 5.0 | 9.5 | 9.5 |
| 130° C. | 12.5 | 9.5 | 12.5 | 12.5 |
| 140° C. | 12.5 | 12.0 | 13.0 | 12.5 |
| 150° C. | 16.0 | 14.0 | 15.5 | 15.0 |
| 160° C. | 16.0 | 15.5 | 16.5 | 16.0 |
| Laundering 5 × 60° C. | | | | |
| 120° C. | 8.5 | 4.5 | 7.5 | 9.0 |
| 130° C. | 12.0 | 9.0 | 11.0 | 12.0 |
| 140° C. | 12.5 | 11.5 | 11.5 | 12.0 |
| 150° C. | 15.5 | 14.0 | 15.5 | 15.0 |
| 160° C. | 16.0 | 14.5 | 16.0 | 16.0 |
| Dry Cleaning 5x | | | | |
| 120° C. | 8.5 | 4.5 | 8.5 | 9.5 |
| 130° C. | 12.0 | 10.0 | 10.5 | 12.5 |
| 140° C. | 13.0 | 11.5 | 12.0 | 12.5 |
| 150° C. | 15.5 | 15.5 | 16.0 | 16.0 |
| 160° C. | 16.0 | 15.5 | 15.5 | 16.0 |
| Weight Applied g/m² | 16 | 14 | 15 | 15 |

PEG: Polyethyleneglycol diol, $\bar{M}_n = 600$
PTHF: Polytetrahydrofuran diol, $\bar{M}_n = 1000$

COMPARISON SPUNBONDED NONWOVEN MANUFACTURING TRIALS

The products described in the examples above were extruded on conventional commercial laboratory extrusion equipment, which was equipped with a spinning beam with 50 orifices, at mass temperatures of 200° C. After leaving the orifice, the threads, which were slightly intermingled in the current of air, were deposited on a conveyor belt and drawn off. The residence time on the belt was about 3 minutes. At the end of the conveyor belt, the nonwoven material was reeled by means of a reeler on a cardboard tube. In so doing, it was observed that only the nonwoven material of the inventive composition could be reeled without difficulties and without having to introduce an additional release film. Moreover, it could also be unreeled again immediately. The nonwoven material obtained was dry and block-free. In the comparison trials conforming to the state of the art, it was not possible to reel without a release film and the nonwoven material was dry and block-free only after several hours. When the nonwoven material was folded up without a release film, there was bonding.

The examples 1 to 6 were the subject of tests in which the setting time, the time from the extrudate's exit from the extrusion orifice until it reached a blockfree (non-sticky) surface condition, was measured.

Block performance in the extruded products of the examples 1 to 6 and comparative examples 1, and 2:

The products described in the examples 1 to 6 of table 1 were extruded with laboratory extrusion equipment at mass temperatures of 200 ° C. to a film with a thickness of 100 µm. The time from leaving the orifice until reaching a block-free (non sticky) surface was measured. The results are as follows:

| Example No.: | time in sec: |
|---|---|
| 1 | 65 |
| 2 | 65 |
| 3 | 70 |
| 4 | 65 |
| 5 | 65 |
| 6 | 80 |
| Comparative Example | |
| 1 | 125 |
| 2 | 130 |

We claim:

1. Poly(ether ester amides) comprising from 60% wt. to 80% wt. of a polyamide block prepared from the following monomers:

20 to 40% by weight of caprolactam or aminocaproic acid 30 to 50% by weight of 11-aminoundecanoic acid 20 to 40% by weight of the adduct of hexamethylenediamine and decanedicarboxylic acid, the total amount of these polyamide-forming monomers adding up to 100% by weight, and of 20 to 40% by weight of a polyether diol/dicarboxylic acid block prepared from equimolar amounts of polyethylene glycol with an $\bar{M}_n$ molecular weight of 400 to 2,000 and one or several saturated aliphatic dicarboxylic acids with 6 to 36 carbon atoms.

2. The poly(ether ester amides) of claim 1, characterized in that the polyamide block is prepared from the following monomers:

30 to 40% by weight of caprolactam or aminocaproic acid 30 to 40% by weight of 11-aminoundecanoic acid 25 to 35% by weight of the adduct of hexamethylenediamine and decanedicarboxylic acid, the total amount of these polyamide-forming monomers adding up to 100% by weight.

3. The poly(ether ester amides) of claim 1, characterized in that the polyamide block is prepared from the following monomers:

33 to 37% by weight of caprolactam or aminocaproic acid 33 to 37% by weight of 11-aminoundecanoic acid 28 to 32% by weight of the adduct of hexamethylenediamine and decanedicarboxylic acid, the total amount of these polyamide-forming monomers adding up to 100% by weight.

4. A poly(ether ester) amide of claim 1, comprising 65% to 75% by weight based on the poly(ether ester amide) of said polyamide block, and 25% to 35% by weight of said polyether diol/dicarboxylic acid block.

5. A poly(ether ester) amide of claim 1, comprising 68% to 72% by weight based on the poly(ether ester amide) of said polyamide block, and 32% to 28% by weight of said polyether diol/dicarboxylic acid block.

6. A process for preparing a poly(ether ester)-amide which comprises 60 to 80 percent by weight of a polyamide block and 20 to 40 percent by weight of a polyether diol/dicarboxylic acid block, based on the weight of the polyamide block and the polyether diol/dicarboxylic acid block; wherein (a) a monomeric mixture of
  (i) 20 to 40 percent by weight, based on the total weight of (i), (ii), and (iii), of caprolactam or aminocaproic acid,
  (ii) 30 to 50 percent by weight, based on the total weight of (i), (ii), and (iii), of 11-aminoundecanoic acid, and
  (iii) 20 to 40 percent by weight, based on the total weight of (i), (ii), and (iii), of an adduct of hexamethylenediamine and decanedicarboxylic acid, wherein the quantities of (i), (ii), and (iii) sum to 100 percent by weight, is reacted with one or more saturated aliphatic $C_{6-36}$ dicarboxylic acids to yield a polyamide having terminal carboxyl groups, and (b) the polyamide having terminal carboxyl groups is then reacted with a polyethylene glycol having a number average molecular weight of 400 to 2,000, optionally, in the presence of a catalyst, to yield said poly(ether ester)-amide.

7. The method of claim 6, characterized in that the polyamide block is synthesized from 30 to 40% by weight of caprolactam or aminocaproic acid 30 to 40% by weight of 11-aminoundecanoic acid 25 to 35% by weight of the adduct of hexamethylenediamine and decanedicarboxylic acid.

8. The method of claim 6, characterized in that the polyamide block is synthesized from 33 to 37% by weight of caprolactam or aminocaproic acid 33 to 37% by weight of 11-aminoundecanoic acid 28 to 22% by weight of the adduct of hexamethylenediamine and decanedicarboxylic acid.

9. The method of claim 6, characterized in that the poly(ether ester amide) is formed from 65% to 75% by weight of the polyamide block and 25% to 35% by weight of the polyether diol/dicarboxylic acid block.

10. The method of claim 6, characterized in that the poly(ether ester amide) is formed from 68% to 72% by weight of the polyamide block and 32% to 28% by weight of the polyether diol/dicarboxylic acid block.

11. A process for joining by heat sealing textiles, which comprises gluing two or more pieces of textiles together by heating a composition of claim 1.

* * * * *